(No Model.)

C. BIRKERY.
TRAP VALVE.

No. 249,878. Patented Nov. 22, 1881.

Witnesses:

Cornelius Birkery
Inventor.
By atty.

UNITED STATES PATENT OFFICE.

CORNELIUS BIRKERY, OF HARTFORD, CONNECTICUT, ASSIGNOR TO THE HARTFORD SANITARY PLUMBING COMPANY, OF SAME PLACE.

TRAP-VALVE.

SPECIFICATION forming part of Letters Patent No. 249,878, dated November 22, 1881.

Application filed September 24, 1881. (No model.)

*To all whom it may concern:*

Be it known that I, CORNELIUS BIRKERY, of Hartford, in the county of Hartford and State of Connecticut, have invented a new Improvement in Trap-Valves; and I do hereby declare the following, when taken in connection with the accompanying drawings and the letters of reference marked thereon, to be a full, clear, and exact description of the same, and which said drawings constitute part of this specification, and represent, in—

Figure 1:
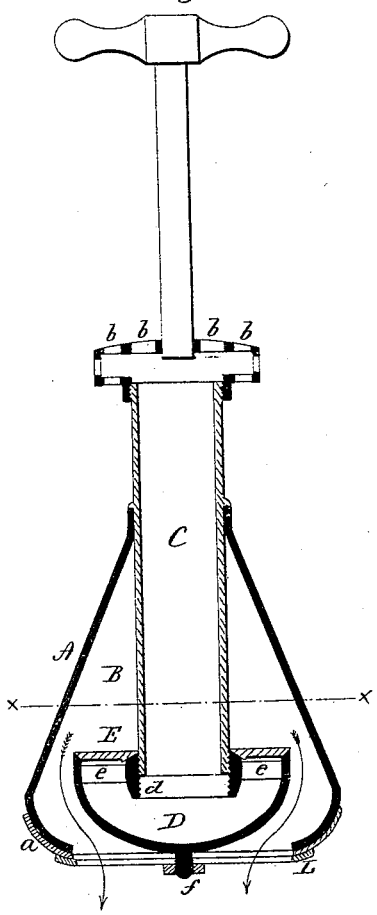
Figure 2:
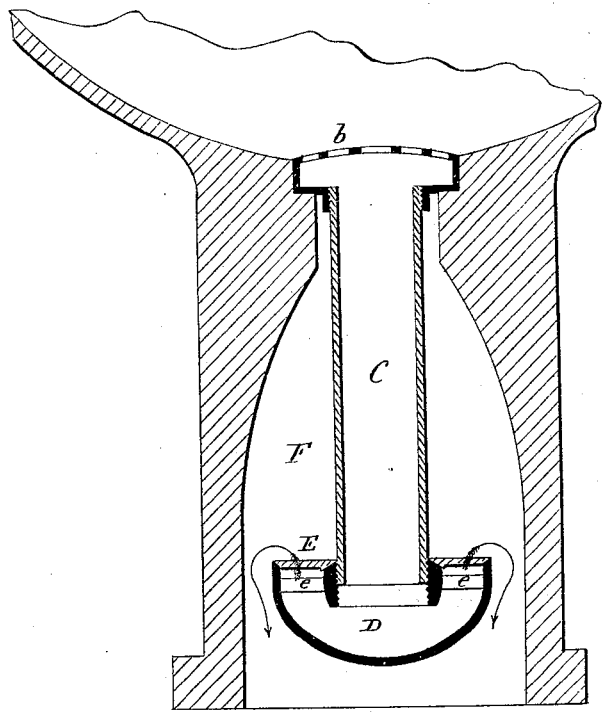
Figure 3:
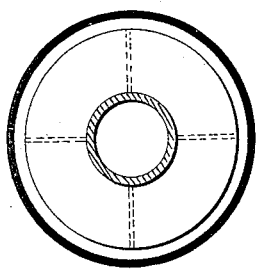
Figure 4:
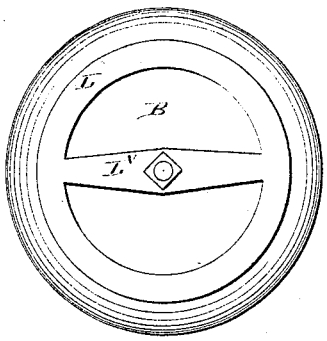

Figure 1, a vertical central section of the valve as applied to water-closets; Fig. 2, a vertical central section as applied to wash-basins; Fig. 3, a transverse section on line $xx$, looking down upon the valve; Fig. 4, an under-side view, looking upward.

This invention relates to an improvement in valves to prevent gases from passing through the overflow-openings, applicable to overflow-valves for water-closets, wash-basins, &c., the object being the arrangement of a valve which will open to permit the escape of overflowing water, and automatically close whenever the flow ceases; and the invention consists in a tube leading from the overflow into a chamber in the waste-passage, the said chamber opening upward outside of said tube, and the opening of the said chamber provided with a valve which will yield and open to permit the escape of water which flows through the tube, and automatically close so soon as the flow ceases, as more fully hereinafter described.

In Fig. 1 I show the outlet-valve of the water-closet known to the trade as "The Hartford Sanitary Closet," and in which the overflow-valve is arranged in the valve which closes the outlet from the bowl.

A represents that valve, which is of conical shape, the base of the valve provided with an india-rubber packing, $a$, which rests upon the valve-seat, the said cone constructed so as to form an internal chamber, B, opening at the bottom.

C is a tube extending upward from the inside of the said chamber, and provided at its upper end with openings $b$, more or less in number, the location of these openings relative to the valve-seat being on the water-level line of the bowl, so that if, by accident or otherwise, water rises above that line, it will pass through the openings $b$ into the tube C. At the lower end of the tube C a chamber, D, is attached concentric with the tube, the chamber around the tube opening upward, and so as to form a seat for a ring-shaped valve, E, which sets around the tube, and so as to perfectly close the chamber D. This valve is free to rise whenever a sufficient pressure of water comes on the under side, and so that when the overflow passes down through the tube C into the chamber D it will force the valve to rise from its seat and permit the overflow to escape, passing through the lower end of the valve A, as indicated by arrows.

As arranged for the waste of wash-basins, the tube C is set into the waste-passage, as seen in Fig. 2, the chamber D and its valve E below in that passage, the said passage of sufficient diameter to permit the free flow of water through the passage, as indicated by arrows.

The overflow may be led to the tube C below the bowl, or a similar valve arrangement may be applied directly in the overflow-passage.

Figure 5:
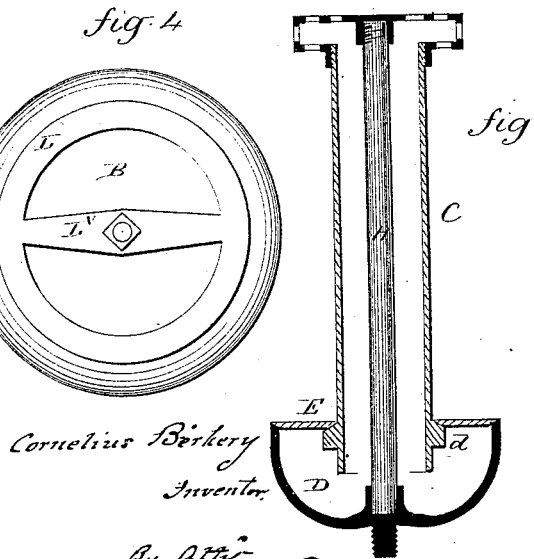

The collar $d$, which makes the attachment with the tube C, as shown in Figs. 1 and 2, is connected with the outer wall by one or more bridges, $e$; but instead of so making the collar it may be attached to the tube C, as seen in Fig. 5, and a rod, H, extending down from the upper end of the tube or cap, connected to the outer wall of the chamber D, as shown. This will leave a clear outlet from the chamber and prevent obstructions which may pass through the overflow or waste catching upon the bridges $e$. By this construction the ring-shaped concentric valve is left perfectly free, so that it may rise at one point and not at another, or may rise bodily, so as to leave an opening entirely around the chamber, and in its movement will rotate more or less, so that the same points are not in working contact for any length of time, which prevents such a wearing as would produce openings through or across the valve-seat. It is therefore more free than a flap-valve can be, and permits a more direct and less circuitous passage and outlet than can be made where a flap-valve is employed.

In the water-closet valve the india-rubber packing *a* is essential, and a considerable difficulty has been experienced in properly securing this packing to the valve, owing to the peculiar shape of the valve, which is made curved in vertical section, so as to insure a perfect fit at some point. Such security of packing I make by the employment of a ring, L, having a bar, L', across it, and through this bar a screw or bolt, *f*, extends, so that the ring laid upon the packing may be secured to the bottom of the chamber D, and thus clamp the inner edge of the packing firmly upon the valve.

I claim—

1. The combination of the tube C, the chamber D, attached to the lower end of said tube, and an upward opening around the tube, with a ring-shaped valve, E, arranged around the said tube and so as to close the said chamber, substantially as described.

2. The valve A, provided with an overflow vertically through it, combined with the packing *a* and the ring L, secured to the overflow and so as to clamp the packing between the body of the valve and the said ring, substantially as described.

CORNELIUS BIRKERY.

Witnesses:
L. H. BRAINARD,
R. W. FARMER.